Feb. 25, 1969   J. S. JOHNSTON   3,430,257
CHART RECORDER USING A THREAD MARKER
Filed April 10, 1967
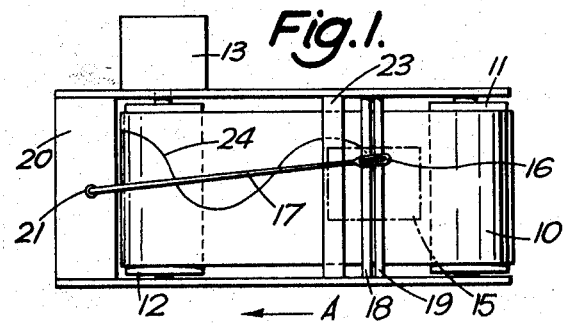
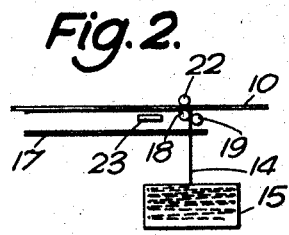
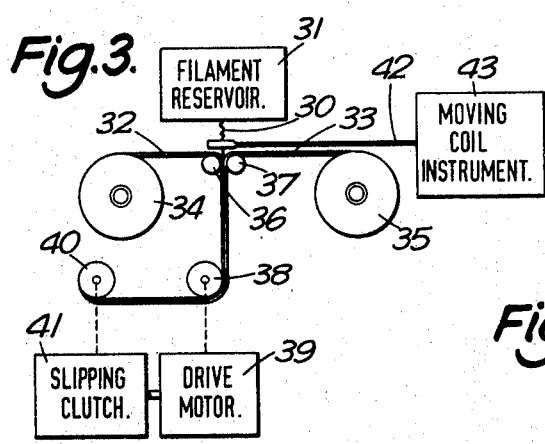
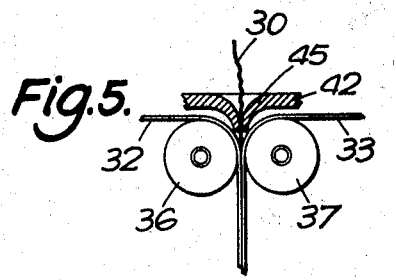
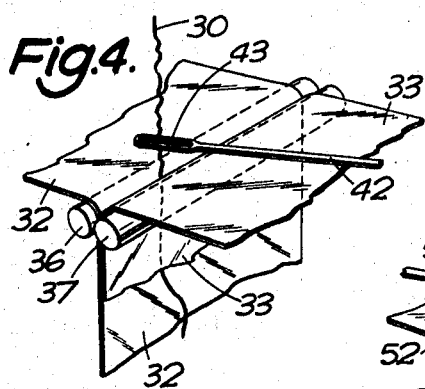
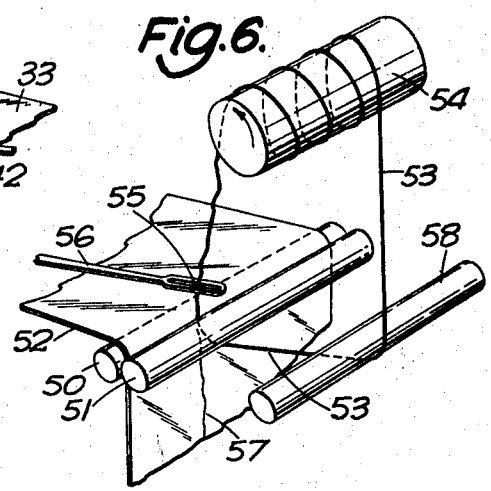

United States Patent Office 3,430,257
Patented Feb. 25, 1969

3,430,257
CHART RECORDER USING A THREAD MARKER
James Stewart Johnston, Bognor Regis, England, assignor to Rosemount Engineering Company Limited, Bognor Regis, England, a British company
Filed Apr. 10, 1967, Ser. No. 629,620
Claims priority, application Great Britain, Apr. 14, 1966, 16,454/66
U.S. Cl. 346—112               16 Claims
Int. Cl. G01d 15/16

ABSTRACT OF THE DISCLOSURE

A chart recorder has a strip or endless loop of chart material driven linearly at constant speed to which a thread or filament is fed at a position across the width of the chart which is controlled by a transducer, e.g., a moving coil instrument or pressure diaphragm. The chart may be coated with an adhesive which can be cured so that the thread or filament forms a permanent record on the chart material of the variations with time of a parameter measured by the transducer.

---

This invention relates to chart recorders.

One of the problems of chart recorders, particularly small recorders, is in the inking or marking system. It is usual to use either pressure sensitive paper, which requires that the marking member should be pressed very firmly against the paper, or to use inking system with ribbons or pens which are often rather messy. Such marking systems moreover impose limitations in the use or construction of the chart recorder; for example, if ink is used, the recorder cannot be inverted, whilst the other systems require a mechanical movement for each mark on the chart.

According to this invention, a recorder comprises a chart which is moved between two elongated parallel guides, and a marker in the form of a thread or filament carried by a movable marker member so that the thread or filament passes between the two guides but is movable axially along the length thereof by the marker member, the thread or filament being arranged to adhere to the chart or to mark the chart as it is pressed against the chart on passing between the guides. These guides may be rollers or may be polished metal elements or elements having a coating of a low friction material such as polytetrafluoroethylene. As the chart is gradually moved forward, it draws the thread or filament with it. The thread or filament adheres to or marks the chart at a position transversely to the direction of movement of the chart dependent upon the position of the movable marker member. The thread adhering to the chart or the mark on the chart provides a record of the relationship of position of the marker member relative to the chart. The marker member typically will be driven by or a part of a measuring instrument or transducer. The chart would usually be drawn between the guides at a uniform speed. Using rollers as guides, the chart might be drawn by the rollers but usually it will be more convenient to provide a separate drive to the chart, the rollers being idler rollers, which can be made of small diameter.

The rollers or guides are preferably made of quite small diameter so as to give a rapid change of plane of the chart. This enables the thread or filament to be brought into good cohesive contact with the surface in a very short distance after leaving the marker member.

The chart may have a surface on which the thread or filament adheres either temporarily or permanently. For example the surface may be coated with an adhesive, such as tacky adhesive or it my have a texture such that the thread or filament adheres, e.g., a felt or a material having a pile. In another arrangement, the chart has a rough surface of relatively hard material, for example sandpaper or the like, and the thread or filament is of material which will cling to the chart surface.

If it is desired to make the chart reusable, the chart surface is formed so that the thread or filament can be pulled off. If it is desired to make a permanent record, the surface may be made so that the thread can be caused permanently to adhere. For an example, an adhesive might be used which can be cured chemically or by heat; the curing can be effected in the recorder, e.g., by providing a heating element in a suitable position such that the marked chart moves adjacent to the heating element. Alternatively the curing can be effected after the chart is removed from the recorder. Instead of using a curable adhesive, the filament might be made from material having a low melting point so that it can be melted so as to be absorbed by or firmly adhered to the chart surface; a low multipoint plastic filament might be employed with a felt or fibrous chart material so that, on heating, the plastic filament will melt into the chart surface. In yet another construction, the thread or filament may be of a material which welds to the chart under a pressure of the rollers or guides and/or by heating one or both of the rollers or guides. In yet another arrangement the thread or filament is fomed of or coated with a material which will enter into a chemical reaction with the surface of the chart to provide a visible or dyed trace after removal of the thread or filament.

The chart may be carried on a drum or disc or may be an endless chart or band. One of the advantages of the present invention however is that the chart may very readily be made from a long strip carried on spools. Most commonly the chart would be driven continuously, for example, by a clockwork mechanism and the marker member moved transversely to or arcuately across the chart to give a record of variations, with respect to time, of some variable. In some arrangements however, the marker member may be kept stationary, and the chart mounted on a movable carrier for example on a drum which is rotated and which is movable axially by means of a bellows mounted inside the drum.

The thread or filament may be a long length drawn from a reel or other reservoir. In the case of a reel, conveniently it is removed from the reel by pulling the end of the thread or filament off axially from one end of the reel so that it is not necessary to rotate the reel which may have an appreciable movement of inertia. The reel may be carried by the marker member or may be on a fixed support, the thread or filament being drawn through the movable marker member as previously described. Very conveniently however, the thread or filament is stored in a reservoir in convoluted or looped form; the filament can be drawn out of such a reservoir with very little tension and such an arrangement can be used with, for example, moving coil instruments, so long as excessive deflection of the marker member is not required.

If the chart is in the form of an endless loop or if only a temporary record is required or if the chart is made of pressure sensitive material, the thread or filament can be in the form of an endless loop. The loop can be long enough so that the thread or filament adheres to or is secured to a length of chart in such a manner that it can be subsequently removed so giving a temporary record over the short length of chart which has just passed through the rollers or guides.

If the marker member is linearly movable, it is arranged to move along the line of the pinch between the two rollers or guides. In many cases however the marker member will be a rotatable arm, the end of which moves through an arc of a circle, as is for example usually the case with moving coil and many other types of electrical measuring instruments. If the marker member is a rotatable arm, it may be an elongated member with a slot at its end remote from the pivot, this slot extending along the length of the member for a sufficient distance so that the thread or filament can pass through the slot and can be traversed longitudinally along the line of the pinch between the two rollers or guides as the marker member is swung about its pivot axis.

In a system having a movable marker member, if adequate power is available to drive the marker member, e.g., in servo-driven recorders, temperature recorders using a powerful bimetal element or a sealed bellow or in pressure recorders operated by a bellows, the thread or filament may be carried on a reel on the marker member. However, it is possible to use an extremely fine filament since, on a contrasting background, a filament of a few thousandths of an inch diameter is clearly visible; such a thin filament may conveniently be held in a reservoir in convoluted or looped form.

It is desirable to keep the clearance between the marker member and chart surface small so that the thread or filament never leaves the marker member at a large angle to the normal. In some cases, it may be possible to achieve this small clearance by allowing the pen to roll on the thread or filament it is laying so that there is virtually no clearance between the marker member and chart surface.

The following is a description of a number of embodiments of the invention, reference being made to the accompanying drawings in which:

FIGURE 1 is a schematic view in elevation of one construction of a chart recorder;

FIGURE 2 is a diagrammatic plan view of part of the apparatus in FIGURE 1;

FIGURE 3 is a diagram illustrating another construction of a chart recorder;

FIGURE 4 is a perspective view of part of the chart recorder of FIGURE 3;

FIGURE 5 illustrates a modification of the construction of FIGURES 3 and 4; and

FIGURE 6 is a diagrammatic perspective view illustrating yet another construction of a chart recorder.

Referring to FIGURES 1 and 2 there is shown a chart recorder having a strip form chart 10 extending between two rollers 11, 12. The chart may be an endless loop around these two rollers as in the embodiment illustrated or it may be a long length of strip drawn from a feed spool and wound up on a take up spool. The chart is driven by a drive motor 13 driving the roller 12 so that the chart moves in the direction of the arrow A. In the case of a long strip chart, the chart drive may be by any convenient means, for example by pinch rollers or by sprockets or by a frictional engagement with a capstan. A length of fine filament 14 is stored in convoluted form in a reservoir 15. The end of the filament extending out of the reservoir passes through an aperture 16 on the end of a marker arm 17 and thence between two rollers 18, 19 which are of small diameter. The arm 17 typically is an arm of a moving coil electrical measuring instrument which is indicated diagrammatically at 20, the arm swinging about a pivot axis 21 so as to move transversely across the width of the chart strip 10. The aperture 16 is made of such length that the filament 14 can pass straight through the aperture into the pinch between the rollers 18, 19 at any angular position of the arm 17. This arm is mounted so as to move closely adjacent to the pinch between the rollers 18, 19 and thus serves to position the filament 14 as it passes between the rollers. The filament 14 extends around the roller 18 and is pressed by this roller against the surface of the chart 10. The chart and the filament pass together between the roller 18 and a further roller 22. In this particular construction, the filament is caused to adhere permanently to the chart strip and for this purpose the chart strip has a coating of adhesive, which is cured as the chart strip and filament passes under a small electric heater 23 so causing the filament to be permanently fixed to the chart surface. It will be seen that as the chart strip moves, the filament is attached to the chart at a point dependent on the position of the arm 17 and thus the filament forms a permanent record, as shown by the part 24 on the left hand side of FIGURE 1, representing the variations with time of the quantity indicated by the instrument 20.

Apparatus similar to that described with reference to FIGURES 1 and 2 may be used where the filament is formed of a low melting point plastic and the chart surface is such that under the action of the heater 23 the filament melts and is absorbed by the chart surface. Instead of using a separate heater 23, the rollers 18 and/or 22 may be heated to effect curing of the adhesive or to cause a low melting point plastic to weld to or be melted into the chart surface.

The construction of FIGURES 1 and 2 may be also used with a chart surface of felt or pile fabric or the like to which a fine filament will adhere, the heater 23 being omitted in this case.

It will be noted that in the construction of FIGURES 1 and 2, the chart remains flat as it passes between the rollers 18, 22 and hence this construction can be used with stiff card charts driven by a sprocket wheel.

FIGURES 3 and 4 illustrate a construction in which a filament is sandwiched between two strips. The filament is shown at 30 and is stored in convoluted form in a filament reservoir 31. The two strips 32, 33 are drawn off from separate spools 34, 35 and pass between two parallel rollers 36, 37 which are pressed one against the other. One or both of the strips 32, 33 has a coating of a pressure sensitive adhesive so that the two strips adhere where they are brought into contact by the rollers 36, 37. One or both of the strips is made of transparent or translucent material so that the filament can be seen in the combined strip. This combined strip is drawn off by means of a capstan 38, driven by a drive motor 39, and is then wound on a take up spool 40 driven also by the drive motor 39 through a slipping clutch 41. If a constant speed drive is not required, the capstan 38 can be omitted and the drive motor 39 can drive the take up spool 40 directly. The parameter to be recorded is represented by the angular position of a market member 42 driven by a suitable drive mechanism 43. For example the member 42 might be an arm attached to a moving coil electrical indicator instrument. This arm has an aperture 43 through which the filament 30 passes and is arranged closely adjacent to the pinch between the rollers 36 and 37 so as to swing in a direction to which the filament 30 along the line of the pinch between the rollers. The filament is thus fed into the rollers at a position determined by the parameter to be recorded and is secured into position by adhesion of the two strips 32, 33 to one another. The two strips and the filament form a sandwich assembly which thus provides a permanent record of the variations in position of the marker member 42 with respect to time. To give an accurate record the part of the member 42 forming the guide for the filaments 30 must be as close as possible to the pinch between the rollers 36 and 37. These rollers are made of small diameter. If, instead of a pivoted arm 42, a linearly movable member is employed to feed the filament into the pinch, e.g., if a diaphragm or bellow structure is used as a transducer this member may, as shown in FIGURE 5, have an eye 45 forming a thread guide which is shaped to extend into the region between two rollers 36, 37 so that the thread leaves the thread guide close as possible to the pinch.

FIGURE 6 illustrates another embodiment of the invention in which there are two rollers 50, 51 between which passes a single strip of pressure sensitive paper 52, that is to say paper of a kind such that pressure on it causes a permanent mark to be left. In the arrangement of FIGURE 6, a continuous loop 53 of a filament extends from a feed and takeup reel 54 through an aperture 55 on the member of an angularly movable marker member 56. This marker member is positioned to cause the filament to move along the length of a pinch between the rollers 50, 51 in accordance with the aixal position of the member 56. The rollers 50, 51 are pressed together and the filament passes between the rollers so as to be pressed against a pressure sensitive paper 52 thereby leaving a mark 57 thereon. The filament passes around the roller 51 and over an idle roller 58 back to the feed and takeup reel 54 which is driven through a slipping clutch or alternatively is driven so that the filament slips on the surface of the paper or of the reel 54. The construction of FIGURE 6 thus also gives a permanent record on the chart of the relationship, with time, of a variable which controls the movable marker member 56.

In the arrangements of FIGURES 1 and 2 it would be possible to use a closed loop of filament, similar to that of FIGURE 6, if only a temporary record for a short time period is required provided the filament only adheres temporarily to the chart strip. A closed loop of filament could also be used in the arrangement of FIGURES 3 and 4 if the strips 32 and 33 are made of such material that they can be pulled apart and the thread withdrawn.

It will be apparent that the invention is applicable to almost any form of chart recording in which a continuous record of a variable is to be kept. As one example, it may be applied to a temperature recorder for recording, over a period of several days or possibly weeks, the variations of temperature; a simple clockwork mechanism can be used for driving the chart to obtain a time-base and the marker member may be driven (or the chart displaced transversely) by a bimetal element or a sealed bllows containing a suitable volatile liquid. Such a recorder may be used for example in a room to give a record of ambient temperature. It will be particularly noted however that the recorder can be made very rugged and, since it has no inking system, it can operate in any attitude, i.e., it need not be any particular way up, and hence it can, for example, be packed with fruit in transport to provide a record of temperature during a journey.

I claim:

1. A chart recorder comprising a pair of elongated parallel guides forming a nip, a chart having a surface coated with adhesive, means for moving said chart through the nip between said parallel guides, a marker member movable transversely across the chart adjacent one of said guides, and a marker in the form of a thread carried by said movable marker member so that the thread passes between the two guides but is movable axially along the length thereof by the marker member, the thread and chart material being arranged so that the thread is secured to the chart by the adhesive as said thread is pressed against the chart on passing between the guides.

2. A chart recorder as claimed in claim 1 wherein said guides are rollers.

3. A chart recorder as claimed in claim 1 wherein said guides are polished metal elements.

4. A chart recorder as claimed in claim 1 wherein said guides have a coating of polytetrafluoroethylene.

5. A chart recorder as claimed in claim 1 wherein the adhesive is of a kind which can be cured.

6. A chart recorder as claimed in claim 5 wherein the adhesive can be cured by heat and wherein an electric heater is provided adjacent the part of the chart surface which has passed between said guides.

7. A chart recorder as claimed in claim 1 wherein the chart is in the form of an endless loop.

8. A chart recorder as claimed in claim 1 wherein the chart is a strip extending between a feed spool and a takeup spool.

9. A chart recorder as claimed in claim 1 wherein the chart is in the form of a rigid card.

10. A chart recorder comprising a pair of elongated parallel guides, a pair of spools carrying strips of material, at least one of which strips is transparent, the two strips extending between said parallel guides, means for drawing the combined strip through said guides, one of said strips being coated with a pressure sensitive adhesive so that the strips adhere together after passing between said guides, a marker carrier member movable parallel to the axes of the guides between the strips entering the guides and a thread carried by said marker member and extending into the pinch between the two strips as they enter the guides, whereby the thread is positioned in the sandwich formed by the two strips at a position transverse to the length of the strips at a location depending on the instantaneous position of the marker member as a thread enters the pinch between the strips.

11. A chart recorder as claimed in claim 10 wherein said means for drawing the combined strip through said guides comprises a motor driving a capstan to draw the combined strip at uniform speed and a takeup spool on which the combined strip is wound.

12. A chart recorder as claimed in claim 10 wherein the marker carrier member has an aperture through which the thread passes and wherein a filament reservoir is provided, housing a length of thread in convoluted form, from which reservoir the thread is drawn by the marker carrier member.

13. A chart recorder as claimed in claim 12 wherein said movable marker member comprises a rotatable arm, one end of which moves through an arc of a circle, which end has a radially extending slot through which the thread passes.

14. A chart recorder comprising a strip-form chart, means for driving said chart from a feed spool to a takeup spool, a pair of guides between which the chart passes, a length of thread or filament contained in a thread or filament store, and a marker member movable transversely to the length of chart, said marker member having a guide guiding said thread or filament from said store so that the thread or filament enters between said pair of guides at a position transverse to the length of the chart dependent on the position of said marker member, said chart and said thread or filament being cooperatively arranged so that the thread or filament permanently adheres to the chart at the position it contacts the chart on passing between said pair of guides.

15. A chart recorder comprising a pair of elongated parallel guides forming a nip, a chart means for moving said chart through said nip between said parallel guides, a marker member movable transversely across the chart adjacent one of said guides, a marker in the form of a thread of material meltable by heat, said thread being carried by said movable marker member so that the thread passes into the nip between the two guides but is movable axially along the length of the nip by said marker member, and an electric heater adjacent the chart surface for melting the thread on the chart surface so that it forms a permanent record on the chart.

16. A chart recorder comprising a pair of elongated parallel guide rollers forming a nip, a chart, means for moving said chart in a straight line through the nip between said parallel guide rollers, a marker member movable transversely across the chart adjacent one of said parallel guide rollers, a marker in the form of a thread carried by said movable marker member so that the thread passes between the two parallel guide rollers but is movable axially along the length thereof by the marker member, a further roller cooperating with one of said parallel guide rollers to form a guide system for the thread, said movable marker member being arranged close to said further roller on the side thereof at which the thread enters the nip, the thread and chart material being arranged so that the thread adheres to the chart as the thread is pressed against the chart on passing between said parallel guide rollers.

References Cited

UNITED STATES PATENTS

| | | | |
|---|---|---|---|
| 813,933 | 2/1906 | Abraham | 346—21 |
| 897,715 | 9/1908 | Cowey | 346—21 |
| 2,601,247 | 6/1952 | Brady | 346—139 X |
| 3,084,014 | 4/1963 | Molloy | 346—139 |

FOREIGN PATENTS

| | | |
|---|---|---|
| 637,863 | 4/1962 | Italy. |
| 672,375 | 10/1963 | Canada. |

RICHARD B. WILKINSON, *Primary Examiner.*

JOSEPH W. HARTARY, *Assistant Examiner.*

U.S. Cl. X.R.

346—21, 76, 135